(12) United States Patent
Hirano et al.

(10) Patent No.: US 7,870,428 B2
(45) Date of Patent: Jan. 11, 2011

(54) METHOD OF DIAGNOSING CIRCUIT BOARD, CIRCUIT BOARD, AND CPU UNIT

(75) Inventors: Katsunori Hirano, Yokohama (JP); Tadanobu Toba, Yokohama (JP); Yuji Sonoda, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 372 days.

(21) Appl. No.: 11/764,833

(22) Filed: Jun. 19, 2007

(65) Prior Publication Data

US 2008/0010533 A1 Jan. 10, 2008

(30) Foreign Application Priority Data

Jun. 20, 2006 (JP) .............................. 2006-169603

(51) Int. Cl.
*G06F 11/00* (2006.01)
(52) U.S. Cl. .......................................... 714/30; 714/22
(58) Field of Classification Search .................... 714/30
See application file for complete search history.

(56) References Cited

U.S. PATENT DOCUMENTS

| | | | |
|---|---|---|---|
| 4,495,568 A * | 1/1985 | Gilbert et al. .................. 714/22 |
| 5,084,871 A * | 1/1992 | Carn et al. .................... 370/462 |
| 5,134,617 A * | 7/1992 | McRoy ......................... 714/32 |
| 5,136,717 A * | 8/1992 | Morley et al. .................. 712/16 |
| 5,418,952 A * | 5/1995 | Morley et al. .................. 712/14 |
| 5,469,570 A * | 11/1995 | Shibata ........................ 717/124 |
| 5,565,766 A * | 10/1996 | Kuwahara et al. ........... 324/158.1 |
| 5,583,987 A * | 12/1996 | Kobayashi et al. ............. 714/13 |
| 5,619,719 A * | 4/1997 | Segelken et al. ............... 712/15 |
| 5,793,946 A * | 8/1998 | Gauthier et al. ............... 714/25 |
| 6,243,665 B1 * | 6/2001 | Nagoya et al. ................ 703/20 |
| 6,988,232 B2 * | 1/2006 | Ricchetti et al. ............. 714/736 |
| 7,072,787 B1 * | 7/2006 | Harel .......................... 702/117 |
| 2005/0080891 A1 * | 4/2005 | Cauthron ..................... 709/223 |
| 2006/0136787 A1 * | 6/2006 | Yano et al. ..................... 714/39 |
| 2007/0230152 A1 * | 10/2007 | Abe ............................ 361/796 |
| 2008/0082866 A1 * | 4/2008 | Li ............................... 714/43 |

FOREIGN PATENT DOCUMENTS

| | | |
|---|---|---|
| JP | 60-072039 | 4/1985 |
| JP | 08-263456 | 10/1996 |
| JP | 10-011319 | 1/1998 |
| JP | 2000-207253 | 7/2000 |
| JP | 2001-051026 | 2/2001 |
| JP | 2001-306307 | 11/2001 |
| JP | 2002-296315 | 10/2002 |
| JP | 3359337 | 12/2002 |

* cited by examiner

*Primary Examiner*—Scott T Baderman
*Assistant Examiner*—Kamini Patel
(74) *Attorney, Agent, or Firm*—Antonelli, Terry, Stout & Kraus, LLP.

(57) ABSTRACT

In a circuit board on which a plurality of CPUs are mounted, the CPUs comprises: monitor units for outputting task statuses of the respective CPUs; and a diagnosis circuit connected to the plurality of CPUs, comparing and judging combinations of the task statuses of the plurality of CPUs based on information on task statuses outputted from the monitor units, and detecting false operations and failures of the circuit board.

19 Claims, 10 Drawing Sheets

FIG. 7

| TASK COMBINATION | CPU No | | | | EXPECTED VALUES (HEXADECIMAL) | COMPARISON AND JUDGMENT |
|---|---|---|---|---|---|---|
| | CPU1 | CPU2 | CPU3 | CPU4 | | |
| | IDOL | IDOL | IDOL | IDOL | (00)h → | ○ (NORMAL) |
| | TASK A | IDOL | IDOL | IDOL | (01)h → | ○ (NORMAL) |
| | TASK B | IDOL | IDOL | IDOL | (02)h → | × (ABNORMAL) |
| | TASK C | IDOL | IDOL | IDOL | (03)h → | ○ (NORMAL) |
| | IDOL | TASK A | IDOL | IDOL | (04)h → | ○ (ABNORMAL) |
| | ............. | ............. | ............. | ............. | ............. | |
| | TASK C | TASK C | TASK C | TASK C | (FF)h → | × (ABNORMAL) |

IDOL : (0)h        TASK B : (2)h
TASK A : (1)h     TASK C : (3)h

METHOD OF DIAGNOSING CIRCUIT BOARD, CIRCUIT BOARD, AND CPU UNIT

CROSS-REFERENCE TO RELATED APPLICATION

The present application claims priority from Japanese patent application No. JP 2006-169603 filed on Jun. 20, 2006, the content of which is hereby incorporated by reference into this application.

BACKGROUND OF THE INVENTION

The present invention relates to a circuit board having semiconductors mounted thereon and to a CPU unit composed of a plurality of circuit boards and, in particular, to a technique of detecting false operations and failures in an operating status of the circuit board.

For high functions of recent electronic appliances, a plurality of LSIs/CPUs (microcomputers) have been packaged on a circuit board with a high density. However, problems of false operations and failures arise in the circuit board due to low voltage and high speed of electronic parts such as semiconductor integrated circuits mounted thereon.

For the high density, in particular, by an appearance of a device having a connection portion on a lower surface of a package substrate represented by a BGA (Ball Grid Array) and the like, it has been difficult to detect the failures visually and by making a probe contact with the device from the outside.

Therefore, as described in, for example, Japanese Patent Laid-open Publication No. 2002-296315 (Patent Document 1), the failures are conventionally detected by providing, outside the circuit board, a command generation function for inspecting functions of the circuit board and an inspection function for inspecting an output from the circuit board.

However, when the circuit board is mounted inside an apparatus, since the external inspection function cannot be connected, the detecting is limited to initial defects in manufacture before the circuit board is mounted on the apparatus and to the failures in a time of the inspection. Therefore, it is difficult to detect the false operations in the operating status.

Further, as a method of providing the inspection function on the circuit board, there is a digital boundary scan test according to IEEE Standard 1149.1. In this method, a digital boundary scan cell and a TAP (Test Access Port) that receives a command and controls the boundary scan cell are built in the semiconductor integrated circuit mounted on the board, thereby diagnosing connection of the semiconductor integrated circuit by sending a few kinds of signals such as TDI (Test Data In), TDO (Test Data Out), TMS (Test Mode Select), and TCK (Test Clock).

SUMMARY OF THE INVENTION

However, since the method by the digital boundary scan test is mainly to diagnose the connection of the circuit board in the apparatus, a problem has been such that it is difficult to detect the false operations and the failures in the operating status. Further, when a CPU (microcomputer) is mounted on the circuit board, there is a method of performing self-diagnosis in the CPU and notifying some abnormality to the outside if the abnormality occurs. However, a problem has been such that: if the CPU that performs the self-diagnosis becomes in malfunction, the diagnosis becomes impossible; and further when a plurality of CPUs cooperate with each other, even if the abnormality in each CPU is nothing, it is difficult to make a diagnosis of whether cooperation control is normal or not.

Further, in recent years, since operating margins occur due to the low voltage and the high speed of the semiconductor integrated circuits mounted on the circuit boards, the false operations and the failures thereof have become problematic. However, by spread of BGA packages and the like for realizing the high density of the circuit board, it has become difficult to detect its failures.

Furthermore, in addition to the detecting of the initial defects at the circuit board manufacture or the failures at the inspection, it has become necessary to detect dynamic false operations in the operating status of mounting the circuit board on the apparatus. In particular, there is a demand for detecting the dynamic false operations when the plurality of CPUs are mounted on the circuit board and the respective CPUs carry out complicated control in cooperation.

Accordingly, an object of the present invention is to provide a method of diagnosing a circuit board, a circuit board, and a CPU unit, which are capable of detecting, at an early stage, dynamic false operations and failures in the circuit board having a CPU mounted thereon without any influence upon the operations of the circuit board.

Outlines of representative ones of the inventions disclosed in the present application will briefly described as follows.

A method of diagnosing a circuit board according to the present invention is a method of diagnosing a circuit board having a plurality of CPUs mounted thereof, the method comprising the steps of: outputting respective task statuses of the plurality of CPUs by respective monitor units provided in the plurality of CPUs; comparing and judging, based on information on task statuses outputted from the monitor units, combinations of the task statuses of the plurality of CPUs by a diagnosis circuit located on the circuit board; and detecting, based on comparison and judgment results, false operations and failures of the circuit board.

Also, a method of diagnosing a circuit board according to the present invention is a method of diagnosing a circuit board having a plurality of CPUs mounted thereof, the method comprising the steps of: outputting respective task statuses of the plurality of CPUs by respective monitor units provided in the plurality of CPUs; comparing and judging, based on information on task statuses outputted from the monitor units, combinations of the task statuses of the plurality of CPUs by a diagnosis circuit connected to an outside of the circuit board on which the plurality of CPUs are mounted; and detecting, based on comparison and judgment results, false operations and failures of the circuit board.

Further, a method of diagnosing a circuit board according to the present invention is a method of diagnosing a plurality of circuit boards having CPUs mounted thereon, the method comprising the steps of: outputting task statuses of the CPUs by monitor units provided in the CPUs; comparing and judging, based on information on task statuses outputted from the monitor units of the respective CPUs, combinations of the task statuses of the CPUs in the plurality of circuit boards by a diagnosis circuit connected to the plurality of circuit boards; and detecting, based on comparison and judgment results, false operations and failures of the plurality of circuit boards.

Furthermore, a circuit board according to the present invention is a circuit board having a plurality of CPUs mounted thereon, the CPUs comprising: monitor units outputting task statuses of the CPUs; and a diagnosis circuit connected to the plurality of CPUs, comparing and judging combinations of the task statuses of the plurality of CPUs based on information on task statuses outputted from the monitor units, and detecting false operations and failures of the circuit board based on comparison and judgment results.

In addition, a CPU unit according to the present invention is a CPU unit having a plurality of circuit boards including CPUs mounted thereon, the CPU unit comprising: the respective CPUs on the plurality of circuit boards having monitor units for outputting task statuses of the CPUs; and a diagnosis circuit connected to the plurality of circuit boards, comparing and judging combinations of the task statuses of the CPUs of the plurality of circuit boards based on information on task statuses outputted from the monitor units of the respective CPUs, and detecting false operations and failures of the plurality of circuit boards based on comparison and judgment results.

These and other objects, features, and advantages of the invention will be apparent from the following more particular description of preferred embodiments of the invention, as illustrated in the accompanying drawings.

BRIEF DESCRIPTION OF THE DRAWINGS

FIG. 7 is a view showing an example of expected value information on the task combinations in the diagnosis circuit of the circuit board according to the embodiment of the present invention;

DESCRIPTION OF THE PREFERRED EMBODIMENTS

Figure 1:
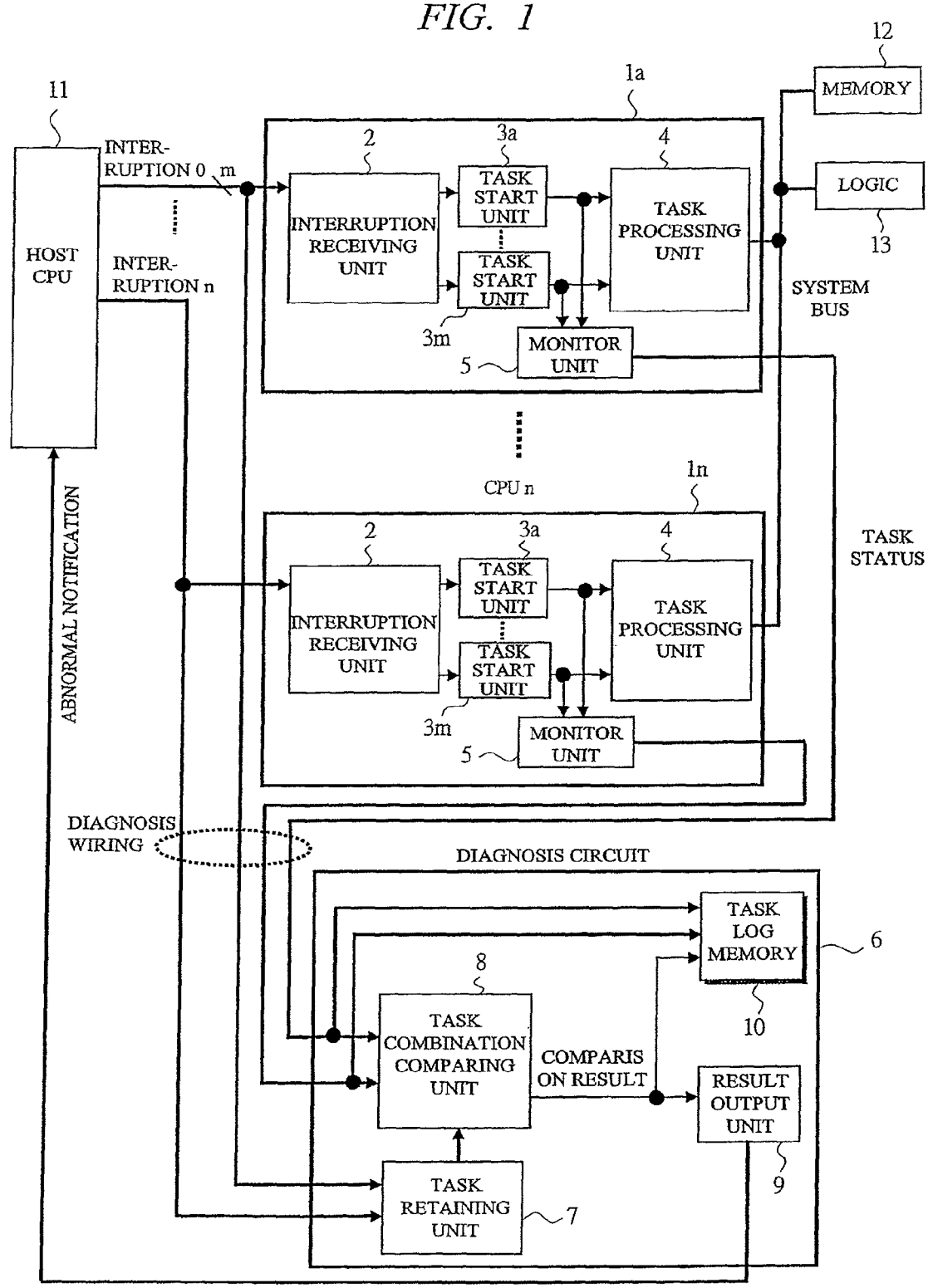
FIG. 1 is a block diagram showing a configuration of a circuit board according to an embodiment of the present invention.

Embodiments of the present invention will be detailed below with reference to the accompanying drawings. Incidentally, throughout all the drawings for explaining the embodiments, the same members are denoted in principle by the same reference numeral, and repetitive explanation thereof will be omitted.

Figure 2:
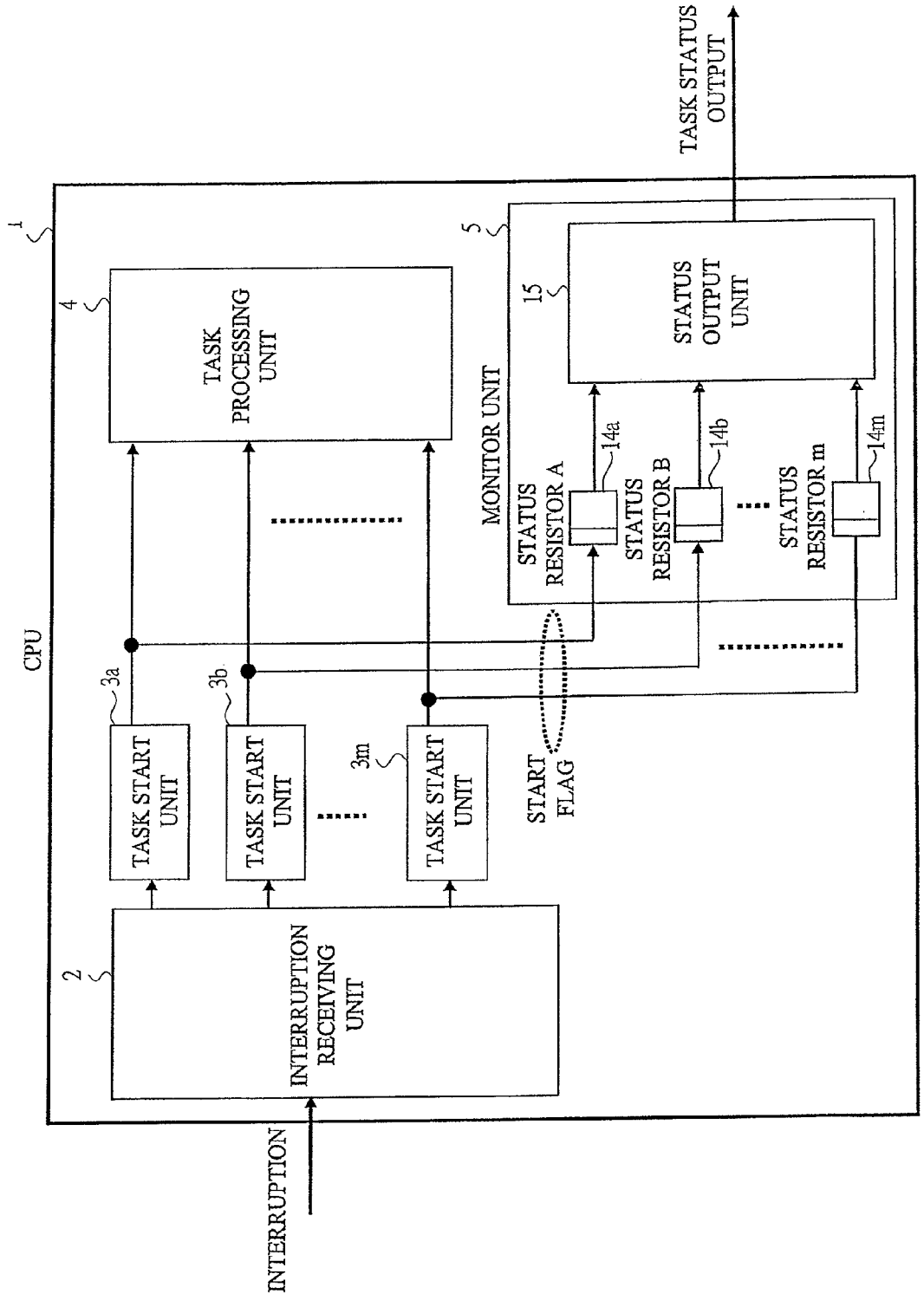
FIG. 2 is a block diagram showing a detailed configuration of a CPU of the circuit board according to the embodiment of the present invention.
Figure 3:
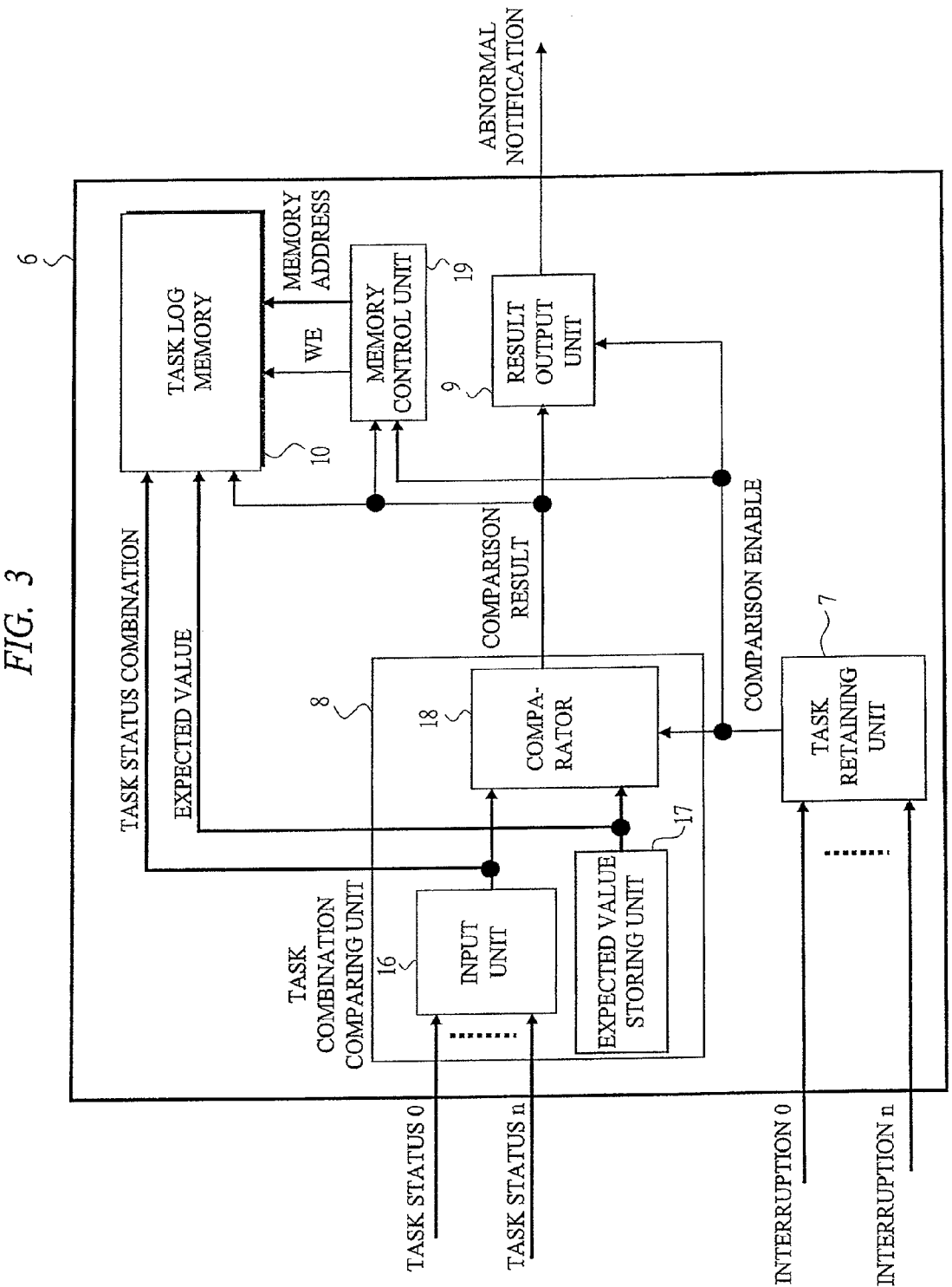
FIG. 3 is a block diagram showing a detailed configuration of a diagnosis circuit of the circuit board according to the embodiment of the present invention.

With reference to FIGS. 1 to 3, a configuration of a circuit board according to one embodiment of the present invention will be described blow. FIG. 1 is a block diagram showing the configuration of the circuit board according to the embodiment of the present invention; FIG. 2 is a block diagram showing a detailed configuration of a CPU of the circuit board according to the embodiment of the present invention; and FIG. 3 is a block diagram showing a detailed configuration of a diagnosis circuit of the circuit board according to the embodiment of the present invention.

In FIG. 1, n CPUs composed of CPUs 1a to 1n, a diagnosis circuit 6, a host CPU 11, a memory 12, and a logic 13 are mounted on the circuit board.

The CPUs 1a to in each have an interruption receiving unit 2, task start units 3a to 3m, a task processing unit 4, and a monitor unit 5.

The diagnosis circuit 6 includes a task retaining unit 7, a task combination comparing unit 8, a result output unit 9, and a task log memory 10.

Interruption signals from the host CPU 11 are connected to the CPUs 1a to in and the diagnosis circuit, and task status signals outputted from the CPUs 1a to in are inputted to the diagnosis circuit 6 via diagnosis wirings.

In FIG. 2, the CPU 1 has the interruption receiving unit 2, the task start units 3a to 3m, the task processing unit 4, and the monitor unit 5 as shown in FIG. 1. The monitor unit 5 has status registers 14a to 14m corresponding to the task start units 3a to 3m, whereby the task status is retained when tasks start by the task start units 3a to 3m. The respective status registers are outputted via a status output unit 15 to the outside of the CPU.

In FIG. 3, the diagnosis circuit 6 has the task retaining unit 7, the task combination comparing unit 8, the result output unit 9, and the task log memory 10 as shown in FIG. 1. The task combination comparing unit 8 has an input unit 16, an expected value storing unit 17, and a comparator 18.

Task statuses from a plurality of CPUs mounted on the circuit board are inputted to the input unit 16, and are compared and judged using expected values stored in the expected value storing unit 17 by the comparator 18. At this moment, the comparison and judgment are performed in accordance with a comparison enable command from the task retaining unit 7.

Further, the task log memory 10 is controlled by a memory control unit 19, and the memory control unit 19 writes task status combinations and expected values into the task log memory 10 according to the comparison enable command and a comparison result from the task retaining unit 7. The result output unit 9 outputs the comparison result to the outside.

<Operation of Circuit Board>

Next, with reference to FIG. 1, an operation of the circuit board according to the embodiment of the present invention will be explained.

First, commands are applied by interruption signals to the CPUs 1a to in from the host CPU 11.

When the interruption signal is inputted by the interruption receiving unit 2 in each of the CPUs 1a to 1n, any of tasks in the task start units 3a to 3m is started based on contents of interruption. The task started by the task start units 3a to 3m is processed by the task processing unit 4.

At this moment, outputs of the task start units 3a to 3m are inputted to the monitor unit 5 and sent from the monitor unit 5 to the outside of the CPUs.

Task statuses outputted from the respective CPUs 1a to in are inputted via the diagnosis wirings to the diagnosis circuit 6. In the diagnosis circuit 6, the interruption signals from the host CPU 11 are inputted into the task retaining unit 7, and the task status signals from the respective CPUs 1a to in are inputted to the task combination comparing unit 8.

When the interruption signals are inputted, the task retaining unit 7 retains an interruption notification and outputs a command to permit task combination comparison to the task combination comparing unit 8.

Herein, the interruption signals are retained until the next interruption signal comes from the host CPU 11.

The task combination comparing unit 8 compares and judges task (status) combinations of the respective CPUs, and outputs a comparison result of whether the task combination is normal or not. At this time, when the comparison result is judged to be abnormal, a signal of an abnormal notification is outputted from the result output unit 9 to the host CPU 11.

Further, when the comparison result is judged to be abnormal, the task combination that has become abnormal is stored into the task log memory 10.

<Diagnosis Processing of Circuit Board>

Figure 4:
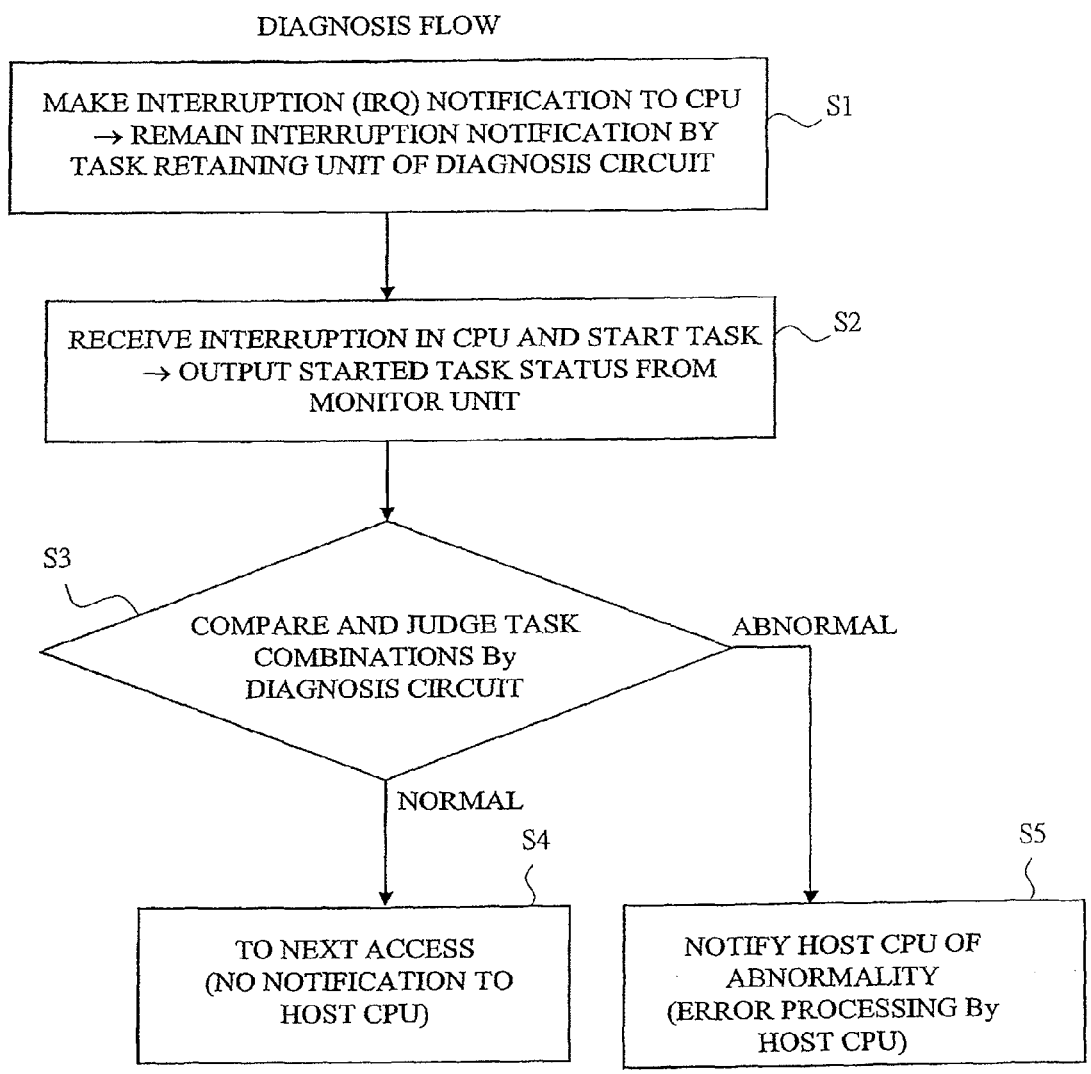
FIG. 4 is a view showing a diagnosis flow of the circuit board according to the embodiment of the present invention.
Figure 5:
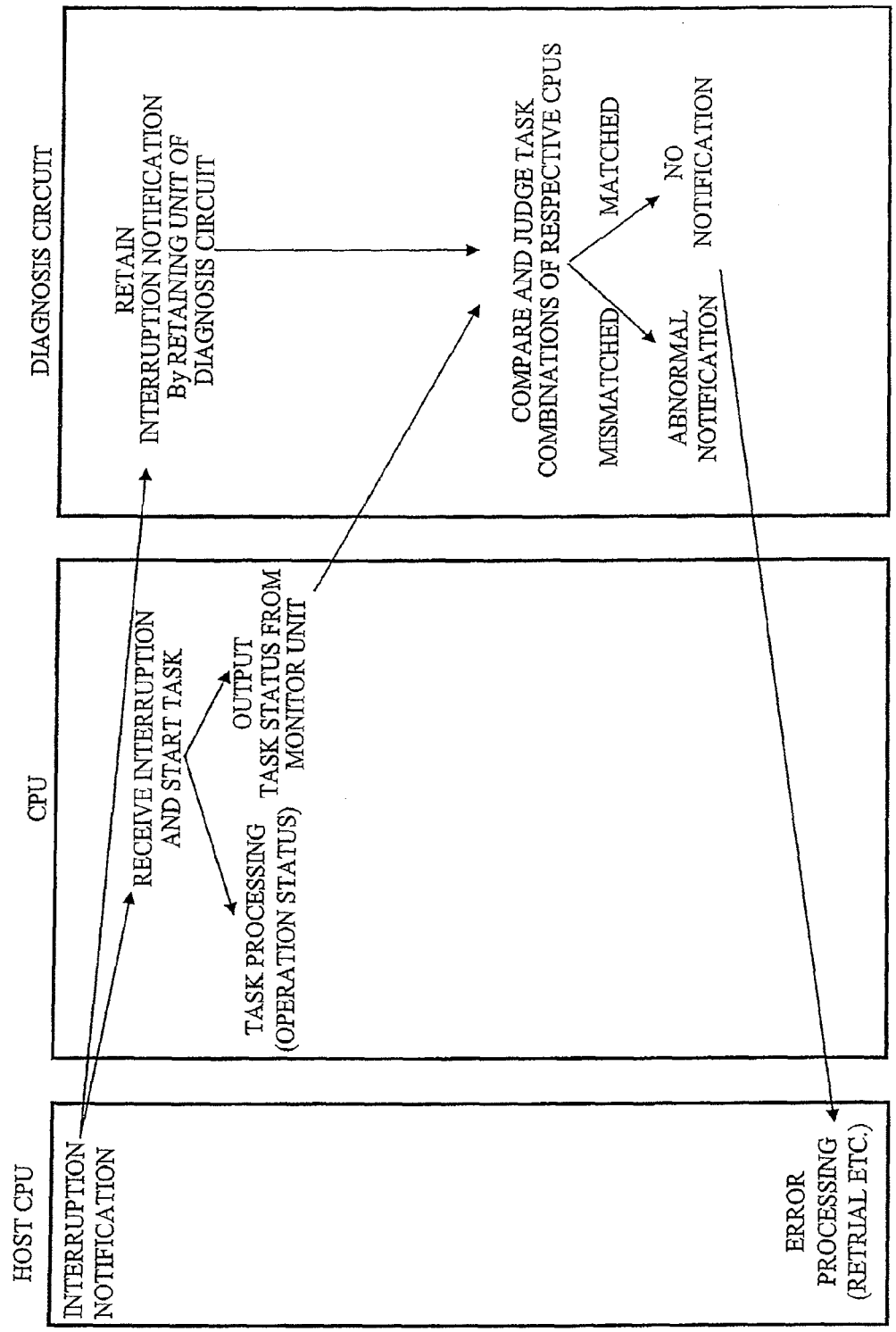
FIG. 5 is a view showing an outline of a diagnosis processing of the circuit board according to the embodiment of the present invention.
Figure 6:
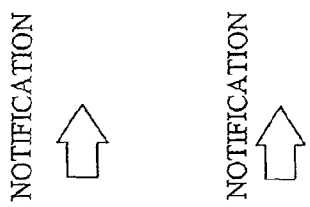
FIG. 6 is a view showing outlines of comparison and judgment of task combinations in the diagnosis circuit of the circuit board according to the embodiment of the present invention.

Next, with reference to FIGS. 4 to 7, a diagnosis processing of the circuit board according to the embodiment of the present invention will be described. FIG. 4 is a view showing a diagnosis flow of the circuit board according to the embodiment of the present invention; FIG. 5 is a view showing an outline of the diagnosis processing of the circuit board according to the embodiment of the present invention; FIG. 6 is a view showing outlines of comparison and judgment of task combinations in the diagnosis circuit of the circuit board according to the embodiment of the present invention; and FIG. 7 is a view showing an example of expected value information on the task combinations in the diagnosis circuit of the circuit board according to the embodiment of the present invention.

As a diagnosis flow of the circuit board, as shown in FIG. 4, first, interruption notifications are made to the CPUs 1a to 1n mounted on the circuit board, and the interruption notifications are retained by the task retaining unit 7 of the diagnosis circuit 6 (S1).

Next, interruption is received by the CPUs 1a to 1n, and the tasks are started and the task statuses are outputted from the monitor unit 5 (S2).

The task combinations are compared and judged by the diagnosis circuit 6 (S3). When their results are normal, the diagnosis circuit does not notify the host CPU 11 of normality (but the host CPU 11 and the CPUs 1a to 1n carry out the next processing). When their results are abnormal, the diagnosis circuit notifies the host CPU 11 of abnormality (the host CPU 11 performs an error processing and the like when the abnormal notification is made).

By the above diagnosis flow, a diagnosis of the task combinations of the plurality of CPUs in the operating status of the circuit board is carried out in real time.

Further, as shown in FIG. 5, the host CPU 11 makes interruption notifications to the CPUs 1a to 1n and the diagnosis circuit 6. When the CPUs 1a to 1n receive the interruption and start the tasks, the CPUs perform the task processings and output the task statuses from the monitor unit 5.

In the diagnosis circuit 6, the interruption notifications are retained by the task retaining unit 7, and when the task statuses are outputted from the CPUs 1a to 1n, the respective task combinations are compared and judged. When respective comparison results are mismatched, the diagnosis circuit notifies the host CPU 11 of abnormality. When the respective comparison results are matched, the diagnosis circuit does not make any notification and waits until the next task combinations are compared and judged.

As an example of comparison and judgment of the task combinations in the diagnosis circuit 6, for example, as shown in FIG. 6, it is assumed that n CPUs are mounted on the circuit board and there are m task combinations. At this time, when the CPU 2 performs the task A and the CPU 3 performs the task C and the other CPUs are each in an IDOL status, the diagnosis circuit judges such a state to be abnormal and notifies the outside of abnormality.

In the same manner, when the CPU 1 performs the task B and the CPU 2 performs the task C and the other CPUs are each in an IDOL status, the diagnosis circuit judges such a state to be abnormal and notifies the outside of abnormality. The diagnosis circuit judges the other combinations to be normal and makes no notification.

Furthermore, as an example of comparison and judgment of the task combinations in the diagnosis circuit 6 performed based on expected value information on the task combinations, as shown in FIG. 7, whether the task combinations of the CPUs 1a to 1n mounted on the circuit board are normal or not is previously stored as expected values in the diagnosis circuit 6. The diagnosis circuit carries out comparisons with and diagnoses of the task statuses from the CPUs 1a to 1n.

The example shown in FIG. 7 corresponds to the case where four CPUs are mounted on the circuit board, wherein the case where the CPU 1 performs the task B and the other CPUs are each in an IDOL status is expressed as "(02)h" in terms of hexadecimal. At this time, a result of its judgment is stored as abnormality.

In the same manner, the case where the CPUs 1 to 4 carry out the task C is expressed by "(FF)h", and results of their judgment are each stored as abnormality. In the same manner as these expected values, the task combinations of the CPUs are expressed in terms of hexadecimal, and the case where the expected value is (02)h or (FF)h is judged to be abnormal.

<Package Example of Circuit Board>

Figure 8:
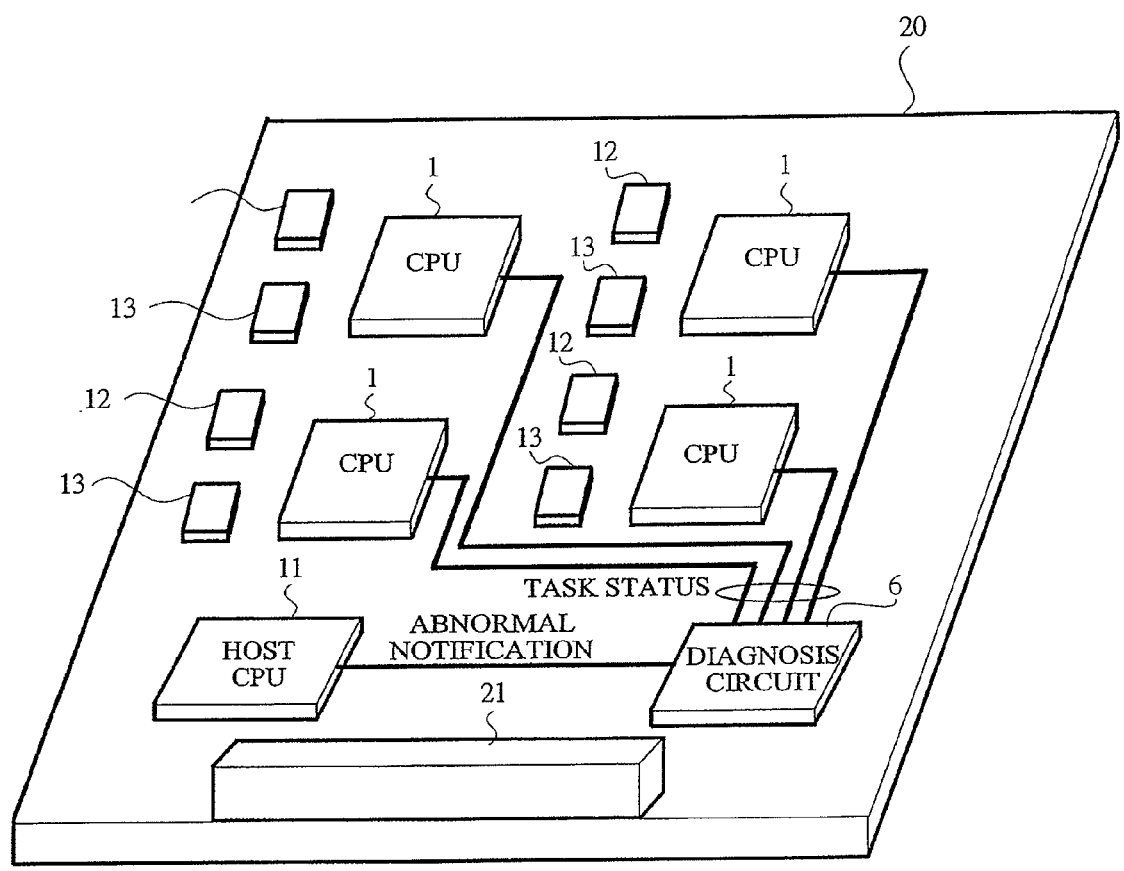
FIG. 8 is a view showing a package example of the circuit board according to the embodiment of the present invention.
Figure 9:
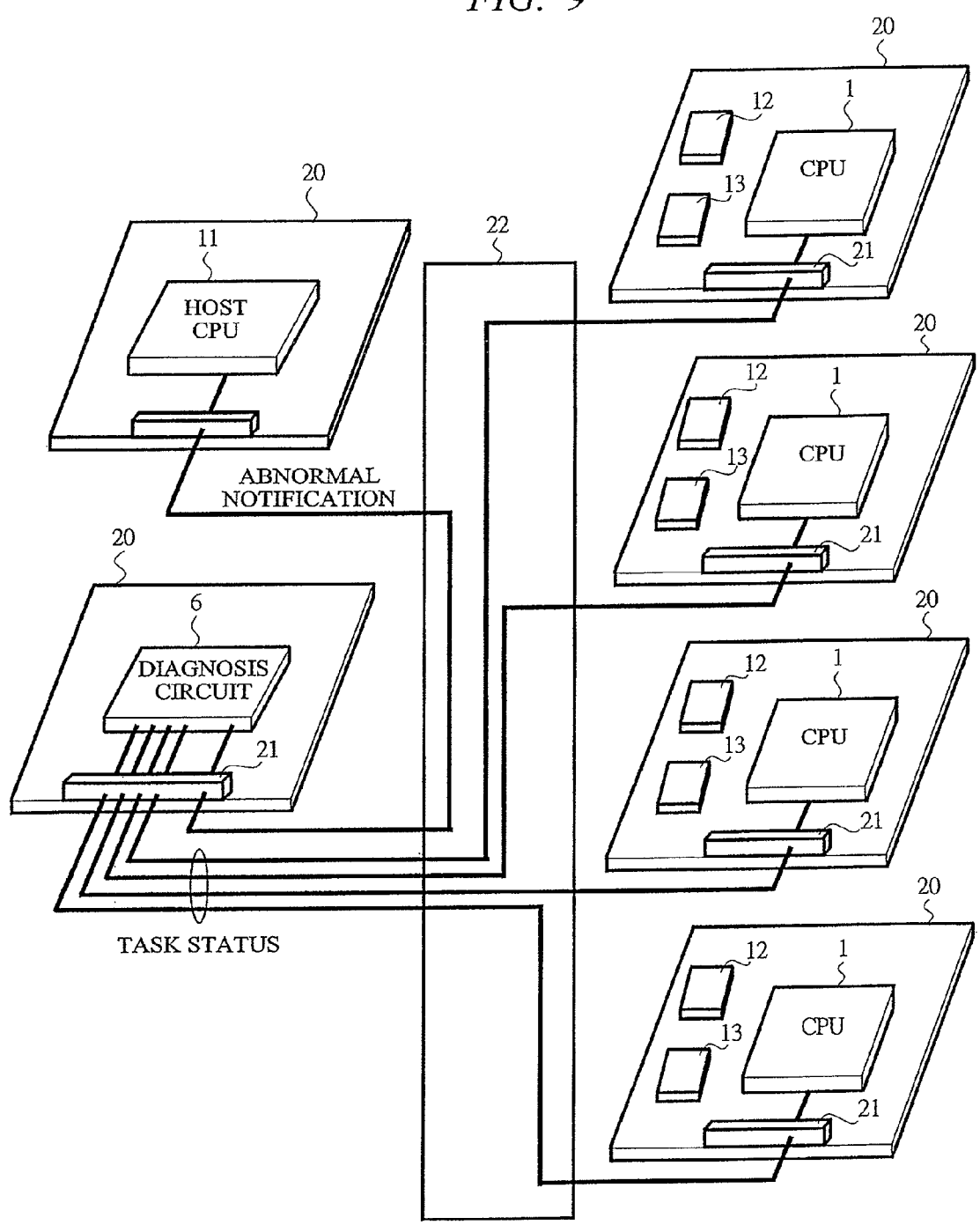
FIG. 9 is a view showing another package example of the circuit board according to the embodiment of the present invention.

Next, with reference to FIG. 8 and FIG. 9, a package example of the circuit board according to the embodiment of the present invention will be described. FIG. 8 and FIG. 9 are views each showing a package example of the circuit board according to the embodiment of the present invention.

In FIG. 8, the CPUs 1, the diagnosis circuit 6, the host CPU 11, the memories 12, the logics 13, and a connector 21 are packaged onto a circuit board 20.

There are wirings for inputting the task statuses to the diagnosis circuit 6 from the respective CPUs 1, and a wiring for making an abnormal notification from the diagnosis circuit 6 to the host CPU 11 is connected.

The host CPU 11 is interfaced via the connector 21 with the outside of the circuit board.

Herein, as shown in FIG. 9, the CPUs 1, memories 12, logics 13 are mounted respectively on single different circuit boards 20, and the diagnosis circuit 6 and host CPU 11 are also mounted respectively on single different circuit boards 20. Therefore, even if the present embodiment has a configuration in which the wirings for inputting the task statuses from the respective CPUs 1 to the diagnosis circuit 6 are connected under an above-mentioned state via a back board 22 to the wiring for making the abnormal notification from the diagnosis circuit 6 to the host CPU 11, e.g., a configuration of a CPU unit and the like, then the task combinations of the plurality of CPUs can be diagnosed in real time in the same manner thereto.

By the above-mentioned configuration, in the circuit board on which the plurality of CPUs are mounted, it is possible to compare and judge the task combinations of the plurality of CPUs in their operation statuses in real time and to diagnose the circuit board.

<Electronic Appliance using Circuit Board>

Figure 10:
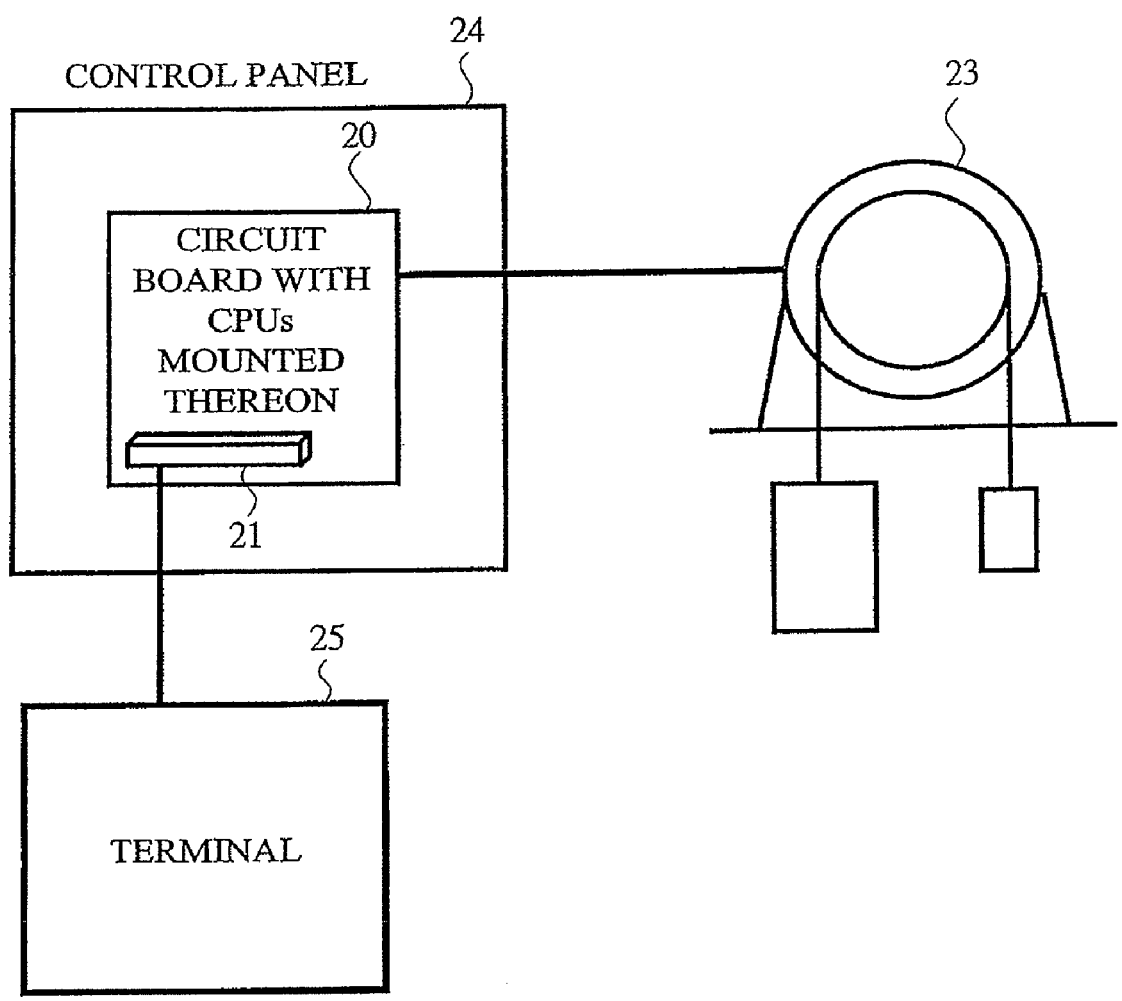
FIG. 10 is a view showing an example of an electronic appliance applying the circuit board according to the embodiment of the present invention.

Next, with reference to FIG. 10, an example of an electronic appliance applying the circuit board according to the embodiment of the present invention will be described. FIG. 10 is a view showing an example of an electronic appliance applying the circuit board according to the embodiment of the present invention, and shows an example of the case of being applied to an elevator maintenance apparatus.

In FIG. 10, a control panel 24 is connected to an elevator 23, and the circuit board 20 to which a diagnosis method according to the present embodiment is applied is mounted on the control panel 24. The circuit board 20 is connected via a connector 21 to a terminal 25.

In an elevator maintenance apparatus, when a circuit board that controls the elevator is failed, a maintenance man is notified of the failed apparatus from any user, comes to it, and confirms its failure state. Then, the maintenance man is required to replace the failed circuit board with new one to restore the elevator maintenance apparatus.

At this moment, since a time from an occurrence of failure of the circuit board to a notification made by a user Z becomes a non-operation time of the elevator, it is demanded to detect the failure of the circuit board as quickly as possible.

By applying the diagnosis method according to the present embodiment, since any failure in the operation status can be detected in real time, it is possible to reduce the non-operation time of the elevator.

As described above, the inventions made by the present inventors have been explained specifically based on the embodiments. However, needless to say, the present invention is not limited to the above embodiments and may be variously modified and varied within a scope of not departing from the gist thereof.

For example, in the present embodiment, the case where the circuit board is applied to the elevator maintenance apparatus has been described as an example. However, the present invention is not limited to this and may be applied to an electronic appliance that uses a plurality of CPUs to process a plurality of tasks, for example, to a control board for vehicle and the like.

Effects obtained by representative ones among the inventions disclosed in the present application will be briefly described as follows.

According to the present invention, in the circuit board on which the plurality of CPUs are mounted, since the task combinations of the CPUs in the operation statuses can be compared and judged in real time, it is possible to detect the dynamic false operations and failures at an early stage.

Further, according to the present invention, since diagnosis is made by the diagnosis circuit located outside the CPU, the diagnosis can be separated from ordinary operations of the CPU. Therefore, it is possible to detect the false operations and failures without giving any influence on the operation of the circuit board.

Furthermore, according to the present invention, since the task logs at a time when the task combinations have become abnormal are acquired, it is possible to specify the CPU that has become abnormal in the circuit board. Therefore, it is possible to improve reliability of the circuit board mounted on the apparatus.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of diagnosing a circuit board having a plurality of CPUs mounted thereon, the method comprising the steps of:

sending interruption signals by a host CPU;

receiving, by the plurality of CPUs, the interruption signals sent from the host CPU;

performing ordinary circuit operations, based on the interruption signals from the host CPU, by respective task processing units included in the plurality of CPUs;

outputting task signals, which indicate respective task statuses of the plurality of CPUs, by respective monitor units provided in the plurality of CPUs and operated separately from the task processing units;

comparing and judging, based on the task signals outputted from the respective monitor units of the plurality of CPUs, combinations of the task statuses of the plurality of CPUs by a single diagnosis circuit connected in common to each of the plurality of CPUs; and detecting, based on comparison and judgment results, false operations and failures of the circuit board.

2. The method of diagnosing a circuit board according to claim 1, wherein a board with the single diagnosis circuit is provided on the circuit board.

3. The method of diagnosing a circuit board according to claim 1, wherein a board with the single diagnosis circuit is a board connected outside the circuit board.

4. A method of diagnosing a plurality of circuit boards having CPUs mounted thereon, the method comprising the steps of:

sending interruption signals by a host CPU;

receiving, by the CPUs of the plurality of circuit boards, the interruption signals sent from the host CPU;

performing ordinary circuit operations, based on the interruption signals from the host CPU, by task processing units included in the CPUs of the plurality of circuit boards;

outputting task signals, which indicate task statuses of the CPUs of the plurality of circuit boards, by respective monitor units provided in the CPUs of the plurality of circuit boards and operated separately from the task processing units;

comparing and judging, based on the task signals outputted from the monitor units of the respective CPUs of the plurality of circuit boards, combinations of the task statuses of the CPUs of the plurality of circuit boards by a single diagnosis circuit connected in common to each of the CPUs of the plurality of circuit boards; and detecting, based on comparison and judgment results, false operations and failures of the plurality of circuit boards.

5. The method of diagnosing a circuit board according to claim 1, further comprising the step of:

notifying the host CPU of abnormality when any false operation and failure of the circuit board are detected by the single diagnosis circuit.

6. The method of diagnosing a circuit board according to claim 1, wherein the circuit board and the single diagnosis circuit are connected by a diagnosis wiring, and the information on the task statuses is inputted via the diagnosis wiring to the single diagnosis circuit.

7. The method of diagnosing a circuit board according to claim 2, wherein the circuit board and the single diagnosis circuit are connected by a back board, and the information on the task statuses is inputted via a diagnosis wiring for the back board to the single diagnosis circuit.

8. The method of diagnosing a circuit board according to claim 1, wherein comparing and judging the combinations of the task statuses of the plurality of CPUs are carried out based on information on expected values of the task statuses of the plurality of CPUs.

9. A circuit board comprising:
a host CPU sending interruption signals;
a plurality of CPUs receiving the respective interruption signals sent from the host CPU; and
a single diagnosis circuit connected in common to each of the plurality of CPUs and receiving respective task signals sent from the plurality of CPUs to carry out a diagnosis,
wherein the plurality of CPUs include:
   task processing units for performing, based on the interruption signals from the host CPU, ordinary circuit operations; and
   monitor units provided respectively in the plurality of CPUs and operated separately from the task processing units to output the task signals of the CPUs, and
wherein the single diagnosis circuit compares and judges combinations of the task statuses of the plurality of CPUs based on the task signals outputted from the respective monitor units of the plurality of CPUs, and detects false operations and failures based on comparison and judgment results.

10. The circuit board according to claim 9, further comprising:
a diagnosis wiring for connecting the circuit board and the single diagnosis circuit,
wherein the information on the task statuses is inputted via the diagnosis wiring to the single diagnosis circuit.

11. The circuit board according to claim 10,
wherein the single diagnosis circuit notifies the host CPU of abnormality when detecting any false operation and failure of the circuit board.

12. The circuit board according to claim 9,
wherein the single diagnosis circuit performs comparison and judgment of the combinations of the task statuses of the plurality of CPUs based on information on expected values of the task statuses of the plurality of CPUs.

13. A CPU unit comprising:
a host CPU sending interruption signals;
a plurality of CPUs receiving the respective interruption signals sent from the host CPU; and
a single diagnosis circuit connected in common to each of the plurality of CPUs and receiving respective task signals sent from the plurality of CPUs to carry out a diagnosis,
wherein the plurality of CPUs includes:
   task processing units for performing, based on the interruption signals from the host CPU, ordinary circuit operations; and
   monitor units provided respectively in the plurality of CPUs and operated separately from the task processing units to output the task signals of the CPUs, and
wherein the single diagnosis circuit compares and judges combinations of the task statuses of the plurality of CPUs based on the task signals outputted from the respective monitor units of the plurality of CPUs, and detects false operations and failures based on comparison and judgment results.

14. The CPU unit according to claim 13, further comprising:
a back board for connecting the circuit boards and the single diagnosis circuit,
wherein the information on the task statuses is inputted via a diagnosis wiring for the back board to the single diagnosis circuit.

15. The CPU unit according to claim 13,
wherein a circuit board having the host CPU mounted thereon is notified, by the single diagnosis circuit, of abnormality when the single diagnosis circuit detects any false operation and failure of the circuit board.

16. The CPU unit according to claim 13,
wherein the single diagnosis circuit performs comparison and judgment of the combinations of the task statuses of the plurality of CPUs based on the information on expected values of the task statuses of the plurality of CPUs.

17. The method of diagnosing a circuit board according to claim 1,
wherein a task log memory in the single diagnosis circuit acquires task logs when the comparison and judgment results of the combinations of the task statuses of the plurality of CPUs are abnormal.

18. The circuit board according to claim 9, further comprising, in the single diagnosis circuit, a task log memory for acquiring task logs when the comparison and judgment results of the combinations of the task statuses of the plurality of CPUs are abnormal.

19. The CPU unit according to claim 13, further comprising, in the single diagnosis circuit, a task log memory for acquiring task logs when the comparison and judgment results of the combinations of the task statuses of the plurality of CPUs are abnormal.

* * * * *